(12) United States Patent
Chu

(10) Patent No.: US 7,555,495 B2
(45) Date of Patent: Jun. 30, 2009

(54) APPARATUS AND METHOD FOR ROUTING COMPOSITE OBJECTS TO A REPORT SERVER

(75) Inventor: Cheong-Wei Chu, Burnaby (CA)

(73) Assignee: Business Objects Software Ltd., Dublin (IE)

( * ) Notice: Subject to any disclaimer, the term of this patent is extended or adjusted under 35 U.S.C. 154(b) by 381 days.

(21) Appl. No.: 11/403,459

(22) Filed: Apr. 12, 2006

(65) Prior Publication Data

US 2007/0244848 A1 Oct. 18, 2007

(51) Int. Cl.
*G06F 7/00* (2006.01)
*G06F 17/00* (2006.01)

(52) U.S. Cl. .................. 707/102; 707/103 R

(58) Field of Classification Search .......... 707/1–4, 707/100–102, 103 R; 705/1, 4
See application file for complete search history.

(56) References Cited

U.S. PATENT DOCUMENTS

| | | | | |
|---|---|---|---|---|
| 6,031,625 A | * | 2/2000 | Sherman et al. | 358/1.18 |
| 6,834,285 B1 | * | 12/2004 | Boris et al. | 707/103 R |
| 6,925,468 B1 | * | 8/2005 | Bobbitt et al. | 707/102 |
| 7,188,100 B2 | * | 3/2007 | De Bellis et al. | 707/3 |
| 7,272,815 B1 | * | 9/2007 | Eldridge et al. | 717/101 |
| 7,293,031 B1 | * | 11/2007 | Dusker et al. | 707/101 |
| 2002/0169734 A1 | * | 11/2002 | Giel et al. | 706/45 |
| 2003/0208493 A1 | * | 11/2003 | Hall et al. | 707/100 |
| 2005/0216830 A1 | * | 9/2005 | Turner et al. | 715/513 |
| 2006/0004745 A1 | * | 1/2006 | Kuhn et al. | 707/4 |
| 2006/0041539 A1 | * | 2/2006 | Matchett et al. | 707/3 |

* cited by examiner

*Primary Examiner*—Don Wong
*Assistant Examiner*—Merilyn P Nguyen
(74) *Attorney, Agent, or Firm*—Cooley Godward Kronish LLP

(57) ABSTRACT

A computer readable medium stores computer executable instructions to receive a collection of composite objects. An aggregate dataset that includes a portion of the contents of object instances in the collection of objects is created. The aggregate dataset is passed to a report server. A report that includes data from the aggregate dataset is accepted.

3 Claims, 5 Drawing Sheets

500

502

Quotation      Pulpular Fiction Books, Ltd.

Shipping to:     Billing Address:

A. V. Reader      Same
742 Evergreen Terrace
City, State, Postal Code
Country

504

The Hitchhiker's Guide to the Galaxy - Douglas Adams
$7.99 - Quantity: 1
Condition: new

506

Norwegian Wood (Vintage International Original) - Haruki Murakami
$10.74 - Quantity: 1
Condition: new

508

One Day in the Life of Ivan Denisovich (Signet Classics (Paperback)) - Aleksandr Isaevich Solzhenitsyn
$5.95 - Quantity: 1 -
Condition: new

510

| | |
|---|---|
| Items: | $24.68 |
| Shipping & Handling: | $11.46 |
| Total Before Tax: | $36.14 |
| Estimated Tax: | $0.00 |
| Total: | $36.14 |

FIG. 5

APPARATUS AND METHOD FOR ROUTING COMPOSITE OBJECTS TO A REPORT SERVER

BRIEF DESCRIPTION OF THE INVENTION

This invention relates generally to reporting technology and application programming. More particularly, this invention relates to apparatuses and methods for creating reports from composite objects.

BACKGROUND OF THE INVENTION

Business Intelligence (BI) generally refers to software tools used to improve business enterprise decision-making. These tools are commonly applied to financial, human resource, marketing, sales, customer and supplier analyses. More specifically, these tools can include: reporting and analysis tools to present information, content delivery infrastructure systems for delivery and management of reports and analytics, data warehousing systems for cleansing and consolidating information from disparate sources, and data management systems, such as relational databases or On Line Analytic Processing (OLAP) systems used to collect, store, and manage raw data.

A subset of business intelligence tools are report generation tools. There are a number of commercially available products to produce reports from stored data. For instance, Business Objects Americas of San Jose, Calif., sells a number of widely used report generation products, including Crystal Reports™, Business Objects OLAP Intelligence™, Business Objects Web Intelligence™, and Business Objects Enterprise™. As used herein, the term report refers to information automatically retrieved (i.e., in response to computer executable instructions) from a data source (e.g., a database, a data warehouse, a plurality of reports, and the like), where the information is structured in accordance with a report schema that specifies the form in which the information should be presented. A non-report is an electronic document that is constructed without the automatic retrieval of information from a data source. Examples of non-report electronic documents include typical business application documents, such as a word processor document, a presentation document, and the like.

A report document specifies how to access data and format it. A report document where the content does not include external data, either saved within the report or accessed live, is a template document for a report rather than a report document. Unlike other non-report documents that may optionally import external data within a document, a report document by design is primarily a medium for accessing and formatting, transforming or presenting external data.

A report is specifically designed to facilitate working with external data sources. In addition to information regarding external data source connection drivers, the report may specify advanced filtering of data, information for combining data from different external data sources, information for updating join structures and relationships in report data, and logic to support a more complex internal data model (that may include additional constraints, relationships, and metadata).

In contrast to a spreadsheet, a report is generally not limited to a table structure but can support a range of structures, such as sections, cross-tables, synchronized tables, sub-reports, hybrid charts, and the like. A report is designed primarily to support imported external data, whereas a spreadsheet equally facilitates manually entered data and imported data. In both cases, a spreadsheet applies a spatial logic that is based on the table cell layout within the spreadsheet in order to interpret data and perform calculations on the data. In contrast, a report is not limited to logic that is based on the display of the data, but rather can interpret the data and perform calculations based on the original (or a redefined) data structure and meaning of the imported data. The report may also interpret the data and perform calculations based on pre-existing relationships between elements of imported data. Spreadsheets generally work within a looping calculation model, whereas a report may support a range of calculation models. Although there may be an overlap in the function of a spreadsheet document and a report document, these documents express different assumptions concerning the existence of an external data source and different logical approaches to interpreting and manipulating imported data.

In normal operation, a report server accesses a data source and launches a query to retrieve data for a report. The report is processed and formatted per the schema that defines the report. In this way, data is pulled from a data source and is placed in a report. Normally, a report server does not treat the data stored in composite objects as a data source for reporting purposes. In accordance with the object oriented paradigm, an application programmer creates an application comprising a collection of individual objects that may act on themselves and each other. This is in contrast to a traditional model in which an application operates as a collection of functions. In designing an object oriented program, a computer programmer produces objects that enable the requirements of the application If reporting is a requirement, the programmer must engage in a lot of activity to produce a report. Further, application programmers do not normally concern themselves with working with data structures that are distinguished by the ease in which they can become data sources for a report server. For example, an application programmer could be working with legacy code that includes a collection of objects designed with no reporting function in mind. However, the application programmer, possibly to satisfy new requirements, may now need to implement a reporting function with the collection of objects as a data source.

A remedy to relieve the application programmer's burden is an application programming interface (API), which provides the application programmer with access to reporting capabilities. However, the API may create a disincentive to the application programmer to create an object that makes a good source for report data. Accordingly, it would be desirable to provide an API that facilitates reporting off objects created by application programmers.

SUMMARY OF INVENTION

The invention includes a computer readable medium that stores computer executable instructions to receive a collection of composite objects. An aggregate dataset that includes a portion of the contents of object instances in the collection of objects is created. The aggregate dataset is passed to a report server. A report that includes data from the aggregate dataset is accepted.

The invention also includes a computer readable medium that stores computer executable instructions to receive a dataset, wherein the dataset comprises an aggregation of data types from a plurality of objects. A report schema is received. The dataset is queried to retrieve data. The data is processed into a report in accordance with the report schema. The data is formatted in the report as specified by the report schema.

The invention also includes a computer implemented method, including creating an aggregate dataset from a collection of composite objects, wherein the aggregate dataset includes a portion of the contents of object instances in the collection of objects. The aggregate dataset and a report identifier are pushed to a report server. A report schema corresponding to the report identifier is retrieved. The aggregate dataset is queried to retrieve data. The data is processed into a report in accordance with the report schema.

An embodiment of the invention includes a computer readable medium storing computer executable instructions with a first function that receives a collection of objects and creates an aggregate dataset that includes a portion of the contents of object instances in the collection of objects. A second function pushes the aggregate dataset to a report server and receives from the report server a report with data from the aggregate data set.

BRIEF DESCRIPTION OF THE FIGURES

The invention is more fully appreciated in connection with the following detailed description taken in conjunction with the accompanying drawings, in which:

FIG. 5 illustrates a graphical user interface (GUI) that may be utilized in accordance with an embodiment of the invention.

Like reference numerals refer to corresponding parts throughout the several views of the drawings.

DETAILED DESCRIPTION OF THE INVENTION

Various features associated with the operation of the present invention will now be set forth. Prior to such description, a glossary of terms used throughout this description is provided.

An application programming interface (API) is the interface that a program provides in order to service requests from other computer programs, and/or to allow data to be exchanged between the program and another program. For example, an application created by an application programmer may use an API to utilize another program.

A composite object is an object that includes a heterogeneous plurality of simple data types and/or objects. An application programmer can programmatically employ a composite object to create an application that uses an API or invokes a method. A composite object can also include method functions.

Serialization is the process of converting the data representation of an object to another form such that it can be transmitted across a network or saved to a storage medium. The object can be saved in binary or in some human-readable format, such as a markup language. The converted form of the object can be used to re-create the original object, in whole or in part. This process of serializing an object is also known as marshalling an object.

A simple data type is a basic building block for programs and composite data types. What is a simple data type varies with programming language but a typical simple data type includes: Boolean values, integers, floating-point numbers, characters, string types, or references.

Reflection is the ability of an application to observe and optionally modify its structure. It can be applied to an object to get information about the object's structure.

An application programmer is a computer programmer that may use an API in creating an application. The application created by the programmer is for use by the user of a computer.

Figure 1:
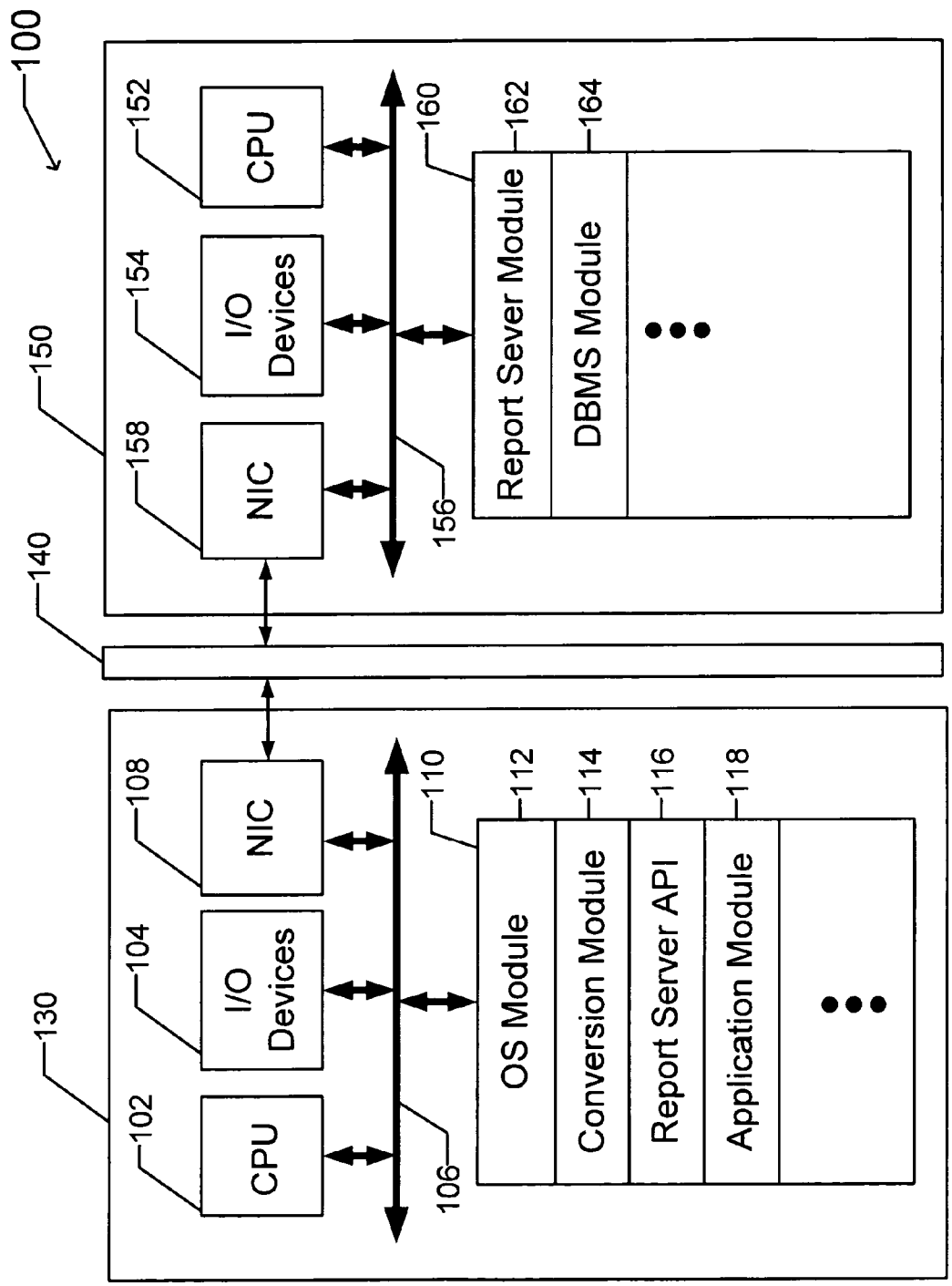
FIG. 1 illustrates a system 100 configured in accordance with an embodiment of the invention.

FIG. 1 illustrates a system 100 configured in accordance with an embodiment of the invention. The system 100 includes one or more coupled computers, e.g. arranged in a client-to-server framework. The system 100 includes a first computer 130 and a second computer 140. A data signal embodied in a carrier wave can be sent from the first computer, via communication channel 140, to the second computer and vice versa.

The first computer 130 includes a central processing unit 102 connected to a set of input/output devices 104 via a bus 108. The input/output devices 104 may include standard components, such as keyboard, mouse, display, printer, and the like. A network interface circuit (NIC) 108 is connected to the bus 106, which is coupled to the CPU 102 and input/output devices 104.

Also connected to the bus 108 is a memory 110. The memory 110 stores executable instructions to implement operations of the invention. In an embodiment the memory 110 stores one or more of the following modules: an operating system module 112, a conversion module 114, a report server application programming interface (API) 116, and an application module 118.

The operating system module 112 includes instructions for handling various system services, such as file services or for performing hardware dependant tasks. The conversion module 114 includes executable instructions to produce an aggregate dataset from a collection of objects stored in the application module 118.

The report server API module 116 includes data and executable instructions to allow programs to interact with a report server, e.g., make requests to a report server. The report server API module 116 can be structured to be language agnostic with inter-operability across computers and platforms. The report server API module 116 includes executable instructions to make function calls across network 140 or a wider network. In an embodiment of the invention, report server API module 116 is configured in accordance with Microsoft's .NET™ framework.

The application module 118 includes executable instructions for the application created by an application programmer for use by the user of computer 130. The application module 118 includes a collection of composite objects that implement, in whole or in part, the application.

The second computer 150 includes a central processing unit 152 connected to a set of input/output devices 154 via a bus 158. The NIC 156 provides connectivity to communication channel 140. Also connected to the bus 158 is a memory 160. The memory 160 stores executable instructions to implement operations of the invention. In an embodiment, the memory 160 stores one or more of the following modules: a report server module 162, and a data source management system (e.g., a DBMS) module 164.

The report server module 162 includes executable instructions to generate reports. The data source management system 164 includes executable instructions to allow a computer program to interface with a data source. Examples of a data source include a database, a data warehouse, a plurality of reports, and the like.

The modules stored in system memories 110 and 160 are exemplary. Additional modules such as a graphical user interface module can be included. It should be appreciated that the functions of the presented modules may be combined. In addition, a function of a module need not be performed on a single machine, e.g., the first computer or the second computer. Instead, the function may be distributed across system 100 or a wider network, if desired. In an embodiment of the present invention, the system 100 may operate in a non-client-sever framework unifying all, or part, of the operations associated with the computers of system 100. Specifically, the report server module 162 can be included in memory 110 of computer 130. It is the functions of the modules that are significant, not where they are performed or the specific manner in which they are performed.

Figure 2:
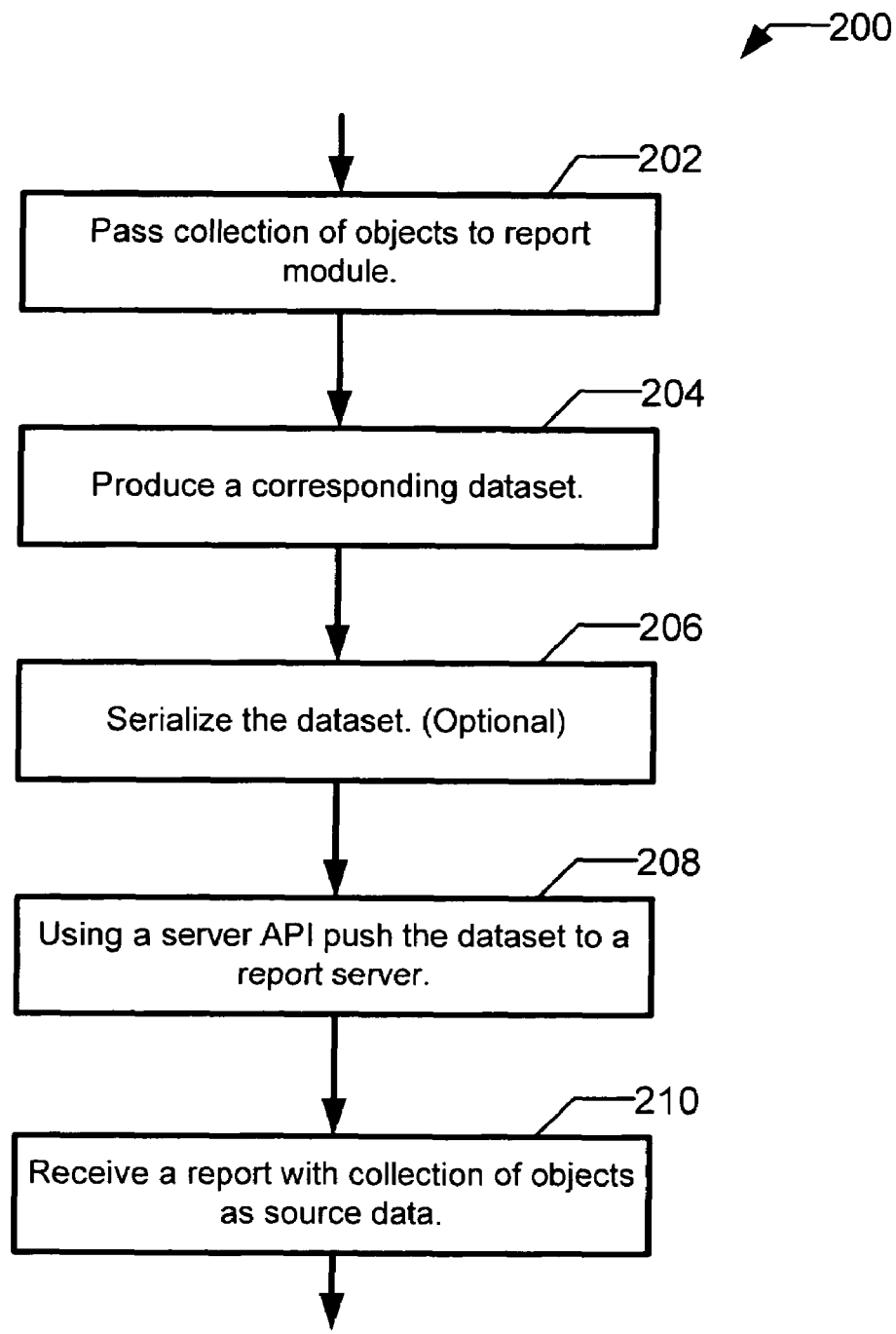
FIG. 2 illustrates a series of processing operations associated with an embodiment of the invention.

FIG. 2 illustrates a series of processing operations associated with an embodiment of the invention. In the first processing operation of FIG. 2, a collection of objects, including one or more objects, are passed to the conversion module 202. For the purposes of illustration, the collection of objects may include a plurality of objects and each object in the plurality of objects may be a composite object. Each composite object may be a different instance of the same type of object.

In processing operation 204, the executable instructions in the conversion module 114 produce an aggregate dataset corresponding to the collection of objects. The aggregate dataset is a binary or human readable dataset that includes a portion of the data from all the objects in the collection of objects.

In the optional processing operation 206, the aggregate dataset is serialized. The instructions in the API module 116 determine if serialization is required, i.e., is the report server module local (on computer 130) or remote (on computer 150). This determination is transparent to the application programmer.

In processing operation 208, an application running on computer 130 makes use of instructions in the API module 116 to push the aggregate dataset to the report server. In the processing operation 210 the report server receives the aggregate dataset, engages in some report processing, and returns a report.

In an embodiment of the present invention, the processing operations 204, 206, and 208 are performed in a manner that is transparent to the application programmer. That is, the application programmer produces code that makes function calls without having to implement every operation in FIG. 2. In an embodiment, the application programmer passes a collection of objects to the conversion module 114, in processing operation 202, and receives a report as a result of processing operation 210. This aspect of the invention is apparent from the following pseudo code segment.

The following code segment is pseudo code that would invoke the processing operations from FIG. 2, and would be similar to code include in the application module 118 from FIG. 1.

| Pseudo Code Segment for Invocation Code | |
|---|---|
| AA | ... |
| AB | report.load( ... reportPath ... ) |
| AC | createArray array1 = [objectInstance_1, objectInstance_2, ..., objectInstance_n] |
| AD | report.setDatSource(array1) |
| AE | report.export(PDF) |
| AF | ... |
| AG | createArray array2 = [pointer_a, pointer_b, ... ] |
| AH | report.setDatSource(array2) |
| AI | report.refresh( ) |

| Pseudo Code Segment for Invocation Code -continued | |
|---|---|
| AJ | report.export(RPT) |
| AK | ... |

In this segment, the pseudo code at: line AB loads a report stored at path: "reportPath"; lines AC and AD set the data for the report as a collection of objects and pushes the collection to the report server; and line AE receives a copy of the report in Adobe Acrobat PDF™ format. Further unspecified operations, such as creating a report object, can occur at lines AA, AF, and AK. This code segment also includes the optional case of refreshing a report in which at: lines AG and AH the data for the report is set as a collection of objects (defined by one or more pointers) and is pushed to the report server; line AI the application requests that the report server refresh the report (query data found in "array2"); and line AJ the application requests and receives a copy of the report.

Figure 3:
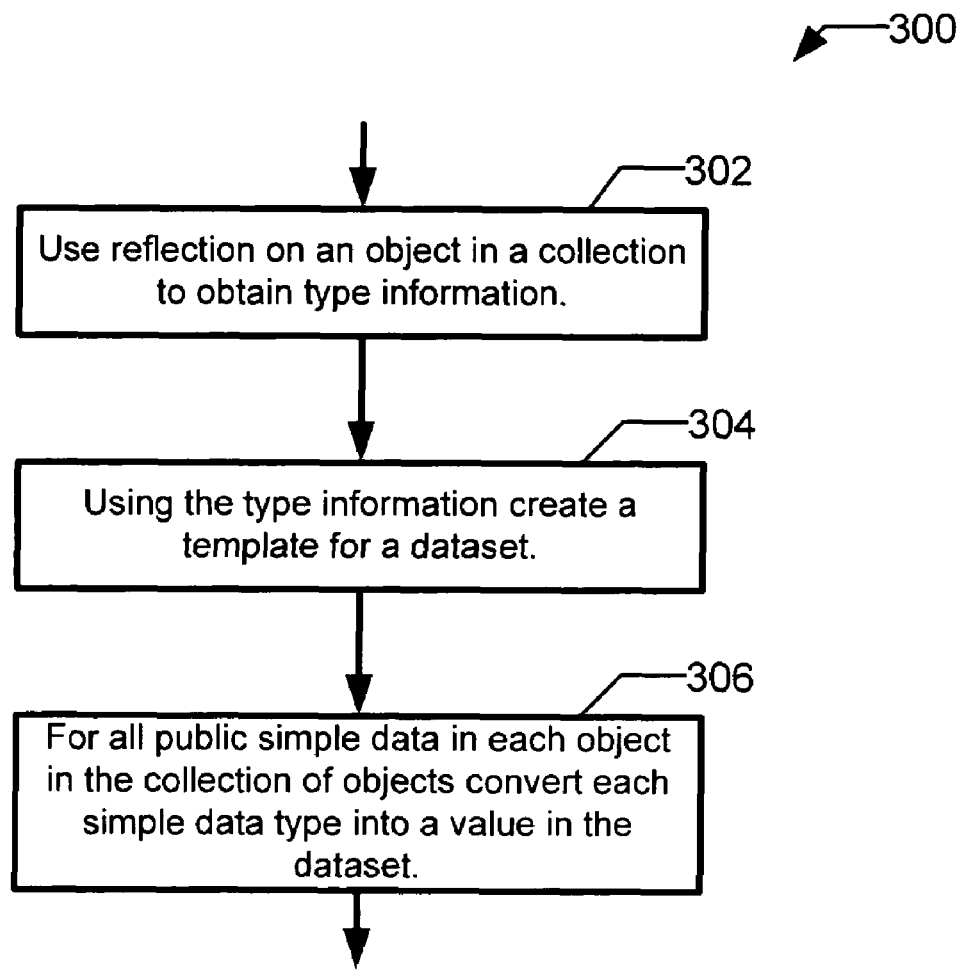
FIG. 3 illustrates a series of processing operations associated with an embodiment of the invention.

FIG. 3 illustrates a series of processing operations which may be used to implement processing operation 204 of FIG. 2, in accordance with an embodiment of the invention. In the first processing operation of FIG. 3 302, reflection is applied to a representative object in a collection of objects. The reflection process obtains type information for each constituent data structure in the representative object. In an embodiment, where each object instance in the collection of objects is the same object, reflection need only be applied to one representative object.

In processing operation 304, the executable instructions in the conversion module 114 use the type information to create a template for the aggregate dataset.

In processing operation 306, all public simple data in each object instance in the collection of objects is converted into a value in the aggregate dataset. In an embodiment, processing operation 306 includes duplicating the template created in operation 304 for each object instance in the collection of objects. Processing operation 306 further includes populating each duplicate template with the value of each simple data type found in each object instance in the collection of objects.

The following code segment is pseudo code that could convert a collection of objects to an aggregate dataset in accordance with the processing operations from FIG. 3.

| Pseudo Code Segment for Conversion | |
|---|---|
| BA | ... |
| BB | dataSet = new Table( ) |
| BC | InfoArray typeOfObject = typeof(objectCollection.getRepresentativeObject( )) |
| BD | propertyInfoArray properties = typeOfObject.GetProperties("public", "simple") |
| BE | foreach (property in properties) |
| BF |    dataSet.AddColumn(property.propertyType( )) |
| BG | endforeach |
| BH | foreach (object in objectCollection) |
| BI |    (if not first object dataSet.AddNewRow( )) |
| BJ |    foreach(property in properties) |
| BK |       dataSet[row = object, column = property] = objectCollection.getValue( ... ) |
| BL |    endforeach |
| BM | endforeach |
| BN | ... |

In this segment the pseudo code at: line BB an aggregate dataset "dataSet" is created; line BC reflection is applied to a representative object; and line BD information on the public and simple data types of the representative object are store in an array. Using the array at lines BE-BG a template is constructed with a column for each property in the representative object. In lines BH-BM for each object and each public simple data type the table "dataSet" is populated with values from the object collection. Further unspecified operations, can occur at lines BA, and BN.

Figure 4:
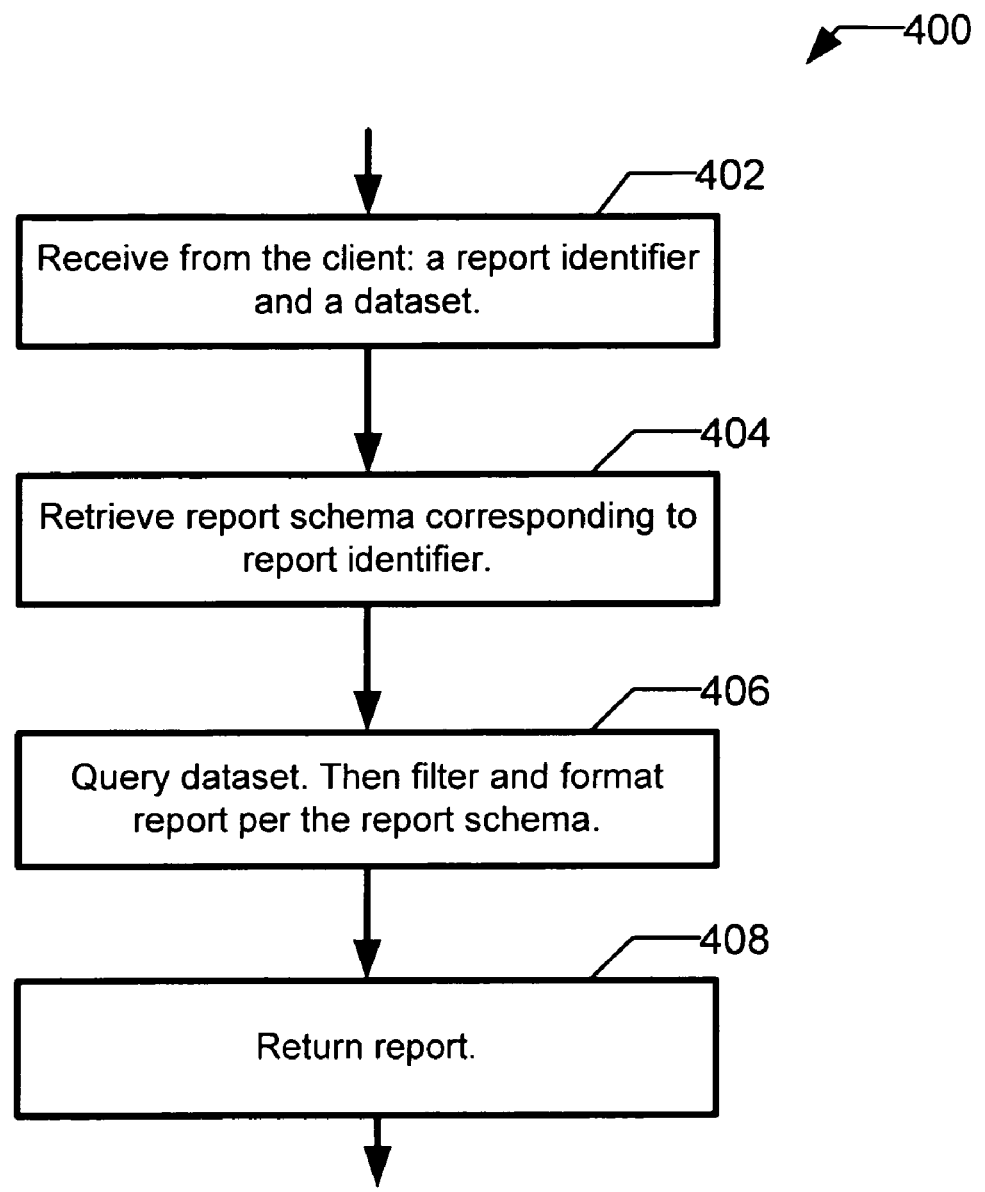
FIG. 4 illustrates a series of processing operations associated with an embodiment of the invention.

FIG. 4 illustrates a series of processing operations associated with the report server module 162 stored in memory 160 of computer 150 of FIG. 1. In processing operation 402, a report server receives a report identifier (e.g., path, unique ID number, name) from a client. Also in processing operation 402, the report server receives an aggregate dataset from the client. The aggregate dataset includes an aggregation of public data drawn from a plurality of objects. Further, the public data are simple data types.

In processing operation 404, the report server retrieves a report schema corresponding to the report identifier. Using this report schema the report server queries the dataset in processing operation 406. Also in operation 406, the report server then processes and formats the report per the report schema. In some cases of processing the data the report server can re-organize data, transform data, or generate new data, e.g., sums or percentages. In processing operation 408 the report server returns the report.

The processing operations described in FIG. 4 are in contrast to the normal pull operation of a report server. In a pull operation an application or a user requests a report from a report server. The report server retrieves the report from a cache, or generates the report content—that is, executes a query against the data source(s) to get a snapshot of data. The report and its data are therefore pulled from the report server. The report server can query a data source with the use of a data source management system, such as the DBMS module 164 shown in FIG. 1, to access a data source(s), not shown.

In accordance with an aspect of the invention, the processing operations described in FIG. 4 are push operations. The data for a report is pushed to the report server. In an embodiment, the report server can perform a normal pull operation, in addition to serving a push operation, by querying a data source to retrieve additional data.

In an embodiment, an application is programmed for use in commerce, e.g., a store. Consider a system for managing a store. The system processes orders and creates associated reports. These reports include: sales reports catalogs, invoices, receipts, quotations, packing slips, product specific information (e.g., instruction, material safety data sheets), and the like. In programming such systems, the programmer is not always concerned with the ease in which the application interfaces with a database. For example in ecommerce, the programmer is often preoccupied with creating an application that presents the store to customers (i.e., the storefront). Conversely, the application programmer could be preoccupied with creating a system that fulfils requirements other than reporting.

For example, an application programmer may want to create an application for a book store. The user of the application is the proprietor of the book store. The proprietor may want to provide a report, such a quotation, to a customer. For example, a customer may want a quotation on the following books:
1) Douglas Adams, 1979, *The Hitchhiker's Guide to the Galaxy*, Del Rey, ISBN: 0345391802.
2) Haruki Murakami, 1987, *Norwegian Wood* (*Noruwei no mori*), Trans. Jay Rubin, Vintage, N.Y., ISBN: 0375704027.
3) Alexandr Solzhenitsyn, 1972, *One Day in the Life of Ivan Denisovich*, Trans. Ralph Parker, Signet, N.Y., ISBN 0141184744.

The application programmer would have developed a system that can provide the required reporting functionality. The application programmer may use an object to represent a book, bookObject. For example, bookObject may have the following pseudo code.

| Pseudo Code for Instance of bookObject | |
|---|---|
| CA | { . . . |
| CB | Author = Haruki Murakami (string) |
| CC | Title = Norwegian Wood (string) |
| CD | Other title = Noruwei no mori (string) |
| CE | Translator = Jay Rubin, Random House (string) |
| CF | Format = Paperback (enumerated type) |
| CG | Pages = 304 (integer) |
| CH | Publisher = Vintage (string) |
| CI | Published = 1987; Reissue edition (September 12, 2000) (composite object) |
| CJ | Language = English (enumerated type) |
| CK | ISBN = 0375704027 (integer) |
| CL | Dimensions = 8.0 × 5.2 × 0.7 inches (composite object) |
| CM | Weight = 9.1 ounces (composite object) |
| CN | Price = US$10.74 (composite object) |
| CO | . . . } |

In this segment, the pseudo code data structures at lines: CB-CE, CH, are strings; CF and CJ, are enumerated types, CG and CK are integers, and the remainder are a composite object, e.g., a dimension object composed of three measures and units. Further, the bookObject can have a function included, such as, creation, accession, mutation, and destruction operators.

In an embodiment of the present invention a collection of bookObjects can be used to create a report, e.g., quotation by transforming a collection of objects into an aggregate dataset and pushing them to a report server. An example of a quotation generated from bookObjects associated with the books given above is shown in FIG. 5. Therein, 500 is a report generated by the application and given by the proprietor to a customer. The details of each person are displayed in header 502. Three books are included in the quote 504, 506 and 508. Not all data from the corresponding bookObject is displayed in quotation 500. This can be a result of formatting, e.g., Publisher, or because the bookObject uses a composite object for the data, e.g., Dimensions. A price is listed on the bottom line 510.

An embodiment of the present invention relates to a computer storage product with a computer-readable medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A computer readable medium storing instructions executed on a computer, comprising instructions to:

receive a collection of composite objects;

perform a reflection operation on a representative object instance in the collection of composite objects;

create an aggregate dataset that includes a portion of contents of object instances in the collection of composite objects, wherein the instructions to create an aggregate dataset comprise instructions to generate the portion of contents of object instances by reflection, wherein the reflection comprises obtaining type information of the object instances in the collection of objects;

construct a template for the aggregate dataset, wherein the aggregate dataset stores contents of each simple data type found in the representative object instance in the collection of composite objects;

duplicate the template for object instances in the collection of composite objects;

populate each duplicate template with a value of each simple data type found in object instances in the collection of composite objects;

pass the aggregate dataset to a report server; and accept a report that includes data from the aggregate dataset.

2. The computer readable medium of claim 1 wherein the portion of the contents includes a simple data type.

3. The computer readable medium of claim 1 further comprising executable instructions to serialize the aggregate dataset.

* * * * *